(12) United States Patent
Osborn

(10) Patent No.: US 8,532,657 B2
(45) Date of Patent: *Sep. 10, 2013

(54) SYSTEM, METHOD, AND COMPUTER-READABLE MEDIUM FOR USER EQUIPMENT REGISTRATION AND AUTHENTICATION PROCESSING BY A FEMTOCELL SYSTEM

(71) Applicant: Christopher Martin Edward Osborn, Allen, TX (US)

(72) Inventor: Christopher Martin Edward Osborn, Allen, TX (US)

(73) Assignee: Ubeeairwalk, Inc. (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/736,376

(22) Filed: Jan. 8, 2013

(65) Prior Publication Data

US 2013/0122868 A1 May 16, 2013

Related U.S. Application Data

(63) Continuation of application No. 12/252,246, filed on Oct. 15, 2008, now Pat. No. 8,351,901.

(60) Provisional application No. 61/003,151, filed on Nov. 15, 2007.

(51) Int. Cl.
*H04W 4/00* (2009.01)

(52) U.S. Cl.
USPC .................................................. 455/435.1

(58) Field of Classification Search
None
See application file for complete search history.

(56) References Cited

U.S. PATENT DOCUMENTS

2009/0070469 A1* 3/2009 Roach et al. ............... 709/226

* cited by examiner

*Primary Examiner* — Rafael Pérez-Gutiérrez
*Assistant Examiner* — Suhail Khan

(57) ABSTRACT

A system, method, and computer readable medium for processing registration and authentication procedures by an IP-based femtocell system are provided. The femtocell system includes a base transceiver station and a Session Initiation Protocol to Internet Operating System adapter. The femtocell system receives a registration message from a user equipment, issues a location update request on behalf of the user equipment, transmits a register message to a core network, receives an authentication request from the core network, and transmits an authentication challenge to the user equipment.

20 Claims, 7 Drawing Sheets

350 ⟶

400 ⟶

| BTS 410 | BSC 420 | ESN Screen 430 | Transcoder 440 | IOS-SIP Adapter 450 |

500 ⟶

510 — REGISTER sip:example.com SIP/2.0
Via: SIP/2.0/UDP
From: sip:12145551212@example.com
To: sip:12145551212@example.com
512 — Contact: sip:12145551212@66.249.73.42
514 — Contact: tel: +1-214-555-1212

SYSTEM, METHOD, AND COMPUTER-READABLE MEDIUM FOR USER EQUIPMENT REGISTRATION AND AUTHENTICATION PROCESSING BY A FEMTOCELL SYSTEM

CROSS REFERENCE TO RELATED APPLICATIONS

This application claims priority to U.S. patent application Ser. No. 12/252,246 entitled SYSTEM, METHOD, AND COMPUTER-READABLE MEDIUM FOR USER EQUIPMENT REGISTRATION AND AUTHENTICATION PROCESSING BY A FEMTOCELL SYSTEM filed Oct. 15, 2008 issued U.S. Pat. No. 8,351,901 issued on Jan. 8, 2013, which in turn claims priority to and is a non-provisional of provisional patent application Ser. No. 61/003,151 entitled SIP-IOS ADAPTER FUNCTION filed Nov. 15, 2007, the disclosures of each of which are incorporated in their entirety herein by reference.

FIELD OF THE INVENTION

The present invention is generally related to radio access technologies and, more particularly, to mechanisms for processing call originations in a network system.

BACKGROUND OF THE INVENTION

Contemporary cellular radio systems, or mobile telecommunication systems, provide an over-the-air interface to wireless user equipments (UEs) via a radio access network (RAN) that interfaces with at least one core network. The RAN may be implemented as, for example, a CDMA2000 RAN, a Universal Mobile Telecommunications System (UMTS) RAN, a Global System for Mobile communications (GSM) RAN, or another suitable radio access network implementation. A UE may comprise, for example, a mobile terminal such as a mobile telephone, a laptop computer featuring mobile telephony software and hardware, a personal digital assistant (PDA), or other suitable equipment adapted to transfer and receive voice or data communications with the radio access network.

A RAN covers a geographical area comprised of any number of cells each comprising a relatively small geographic area of radio coverage. Each cell is provisioned by a cell site that includes a radio tower, e.g., a base transceiver station (BTS), and associated equipment. BTSs communicate with UEs over an air interface within radio range of the BTSs.

Numerous BTSs in the RAN may be communicatively coupled to a base station controller, also commonly referred to as a radio network controller (RNC). The BSC manages and monitors various system activities of the BTSs serviced thereby. BSCs are coupled with at least one core network.

BTSs are typically deployed by a carrier network in areas having a high population density. The traffic capacity of a cell site is limited by the site's capacity and affects the spacing of cell sites. In suburban areas, sites are often up to two miles apart, while cell sites deployed in dense urban areas may be as close as one-quarter of a mile apart. Because the traffic capacity of a cell site is finitely limited, as is the available frequency spectrum, mobile operators have a vested interest in technologies that allow for increased subscriber capacity.

A microcell site comprises a cell in a mobile phone network that covers a limited geographic area, such as a shopping center, hotel, airport, or other infrastructure that may have a high density mobile phone usage. A microcell typically uses power control to limit the radius of the microcell coverage. Typically a microcell is less than a mile wide.

Although microcells are effective for adding network capacity in areas with high mobile telephone usage, microcells extensively rely on the RAN, e.g., a controlling BSC and other carrier functions. Because contemporary BSCs have limited processing and interface capacity, the number of BTSs—whether microcell BTSs or typical carrier BTSs—able to be supported by the BSC or other RAN functions is disadvantageously limited.

Contemporary interest exists in providing small office/home office (SOHO) radio access by an even smaller scale BTS. The radio coverage area of such a system is typically referred to as a femtocell. In a system featuring a femtocell, a UE may be authorized to operate in the femtocell when proximate the femtocell system, e.g., while the UE is located in the SOHO. When the UE moves beyond the coverage area of the femtocell, the UE may then be serviced by the carrier network. The advantages of deployment of femtocells are numerous. For instance, mobile users frequently spend large amounts of time located at, for example, home, and many such users rely extensively on cellular network service for telecommunication services during these times. For example, a recent survey indicated that nearly thirteen percent of U.S. cell phone customers do not have a landline telephone and rely solely on cell phones for receiving telephone service. From a carrier perspective, it would be advantageous to have telephone services provisioned over a femtocell system, e.g., deployed in the user's home, to thereby reduce the load, and effectively increase the capacity, on the carrier RAN infrastructure. However, various issues related to processing user equipment registration and authentication requests in such a system remain unresolved.

Therefore, what is needed is a mechanism that overcomes the described problems and limitations.

SUMMARY OF THE INVENTION

The present invention provides a system, method, and computer readable medium for user equipment registration and authentication processing by an IP-based femtocell system in a network system. The femtocell system provisions communication services to a user equipment. In one implementation, the femtocell system includes a base transceiver station and a Session Initiation Protocol (SIP) to Internet Operating System adapter (SIA). The femtocell system receives a registration message from the user equipment and issues a location update on behalf of the user equipment. The femtocell system transmits both an IP Multimedia Private Identity (IMPI) and IP Multimedia Public Identity (IMPU) to a core network and receives an authentication request therefrom. The authentication request includes a random value used for authenticating the user equipment that is obtained from a home location register with which the user equipment is registered. The femtocell system then transmits an authentication challenge to the user equipment and receives an authentication challenge response therefrom. The femtocell system then transmits the authentication challenge response to the core network. In the event that the challenge response is valid, the user equipment is authenticated and may begin receiving communication services from the femtocell system.

In one embodiment of the disclosure, a method of processing registration and authentication procedures in a network system is provided. The method includes receiving, by a femtocell system from a user equipment, a registration message, issuing, by the femtocell system, a location update request on behalf of the user equipment, transmitting, by the femtocell system, a register message to a core network, receiving, by the femtocell system from the core network, an authentication request, and transmitting an authentication challenge to the user equipment.

In a further embodiment of the disclosure, a computer-readable medium having computer-executable instructions for execution by a processing system, the computer-executable instructions for processing registration and authentication procedures in a network system is provided. The computer-readable medium comprises instructions that receive, by a femtocell system, a registration message from a user equipment, issue a location update request on behalf of the user equipment, transmit a register message including an IP Multimedia Private Identity and an IP Multimedia Public Identity associated with the user equipment to a core network, receive an authentication request from the core network, and transmit an authentication challenge to the user equipment.

In a further embodiment of the disclosure, a system for processing registration and authentication procedures in a network system is provided. The system includes a packet-switched network, an Internet Protocol Multimedia subsystem communicatively coupled with the packet-switched network, and a femtocell system communicatively coupled with the packet-switched network. The femtocell system includes a base transceiver station and a Session Initiation Protocol to Internet Operating System adapter. The base transceiver station receives a registration message from a user equipment and issues a location update request on behalf of the user equipment that is received by the Session Initiation Protocol to Internet Operating System adapter. The Session Initiation Protocol to Internet Operating System adapter transmits a register message including an IP Multimedia Private Identity and an IP Multimedia Public Identity associated with the user equipment to the Internet Protocol Multimedia subsystem and receives an authentication request and a random value used to authenticate the user equipment from the Internet Protocol Multimedia subsystem. The base transceiver station then transmits an authentication challenge to the user equipment.

BRIEF DESCRIPTION OF THE DRAWINGS

Aspects of the present disclosure are best understood from the following detailed description when read with the accompanying figures, in which.

DETAILED DESCRIPTION OF THE INVENTION

It is to be understood that the following disclosure provides many different embodiments or examples for implementing different features of various embodiments. Specific examples of components and arrangements are described below to simplify the present disclosure. These are, of course, merely examples and are not intended to be limiting.

Figure 1:
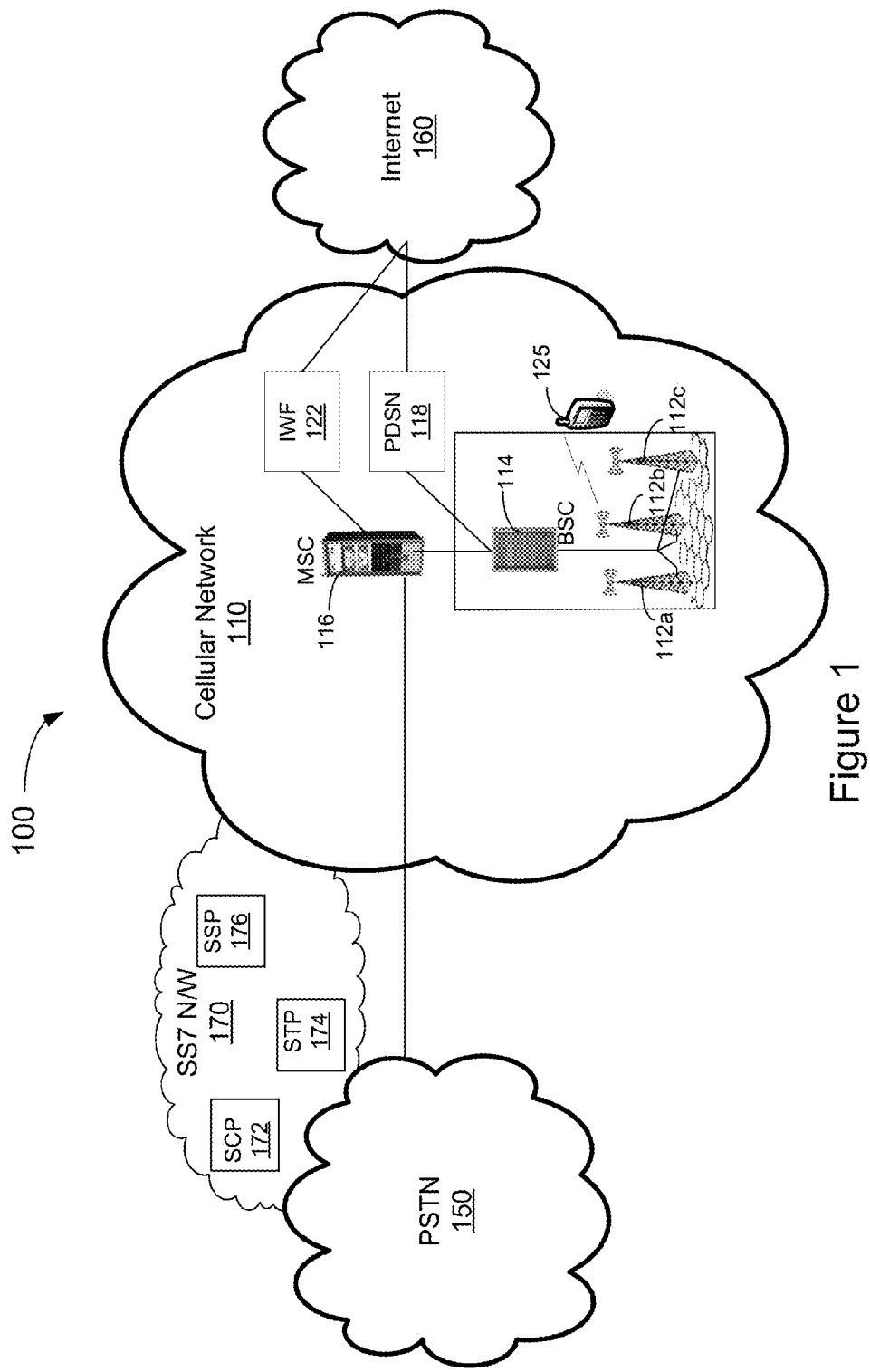
FIG. 1 is a diagrammatic representation of a network system that includes a cellular network adapted to provide macro-cellular coverage.

FIG. 1 is a diagrammatic representation of a network system 100 that includes a cellular network 110 adapted to provide macro-cellular coverage to a user equipment. Cellular network 110 may comprise, for example, a code-division multiple access (CDMA) network, such as a CDMA-2000 network.

Cellular network 110 may include any number of base transceiver stations (BTSs) 112a-112c communicatively coupled with a base station controller (BSC) 114 or RNC. Each individual BTS 112a-112c under the control of a given BSC may define a radio cell operating on a set of radio channels thereby providing service to a user equipment (UE) 125, such as a mobile terminal. BSC 114 manages the allocation of radio channels, receives measurements from mobile terminals, controls handovers, as well as various other functions as is understood. BSC 114 is interconnected with a mobile services switching center (MSC) 116 that provides mobile terminal exchange services. BSC 114 may be additionally coupled with a packet data serving node (PDSN) 118 or other gateway service that provides a connection point between the CDMA radio access network and a packet network, such as Internet 160, and provides mobility management functions and packet routing services. MSC 116 may communicatively interface with a circuit switched network, such as the public switched telephone network (PSTN) 150, and may additionally be communicatively coupled with an interworking function (IWF) 122 that provides an interface between cellular network 110 and PSTN 150.

System 100 may also include a signaling system, such as a signaling system #7 (SS7) network 170. SS7 network 170 provides a set of telephony signaling protocols which are used to set up the vast majority of the world's PSTN telephone calls. SS7 network 170 is also used in cellular networks for circuit switched voice and packet-switched data applications. As is understood, SS7 network 170 includes various signaling nodes, such as any number of service control points (SCPs) 172, signal transfer points (STPs) 174, and service switching points (SSPs) 176.

BTSs 112a-112c deployed in cellular network 110 may service numerous network 110 subscribers. Cell cites provided by BTSs 112a-112c commonly feature site ranges of a quarter to a half mile, e.g., in densely populated urban areas, to one to two miles in suburban areas. In other remotely populated regions with suitable geography, site ranges may span tens of miles and may be effectively limited in size by the limited transmission distance of relatively low-powered UEs. As referred to herein, a cell provided by a BTS deployed in carrier network 110 for access by any authorized network 110 subscriber is referred to as a macrocell.

Figure 2:
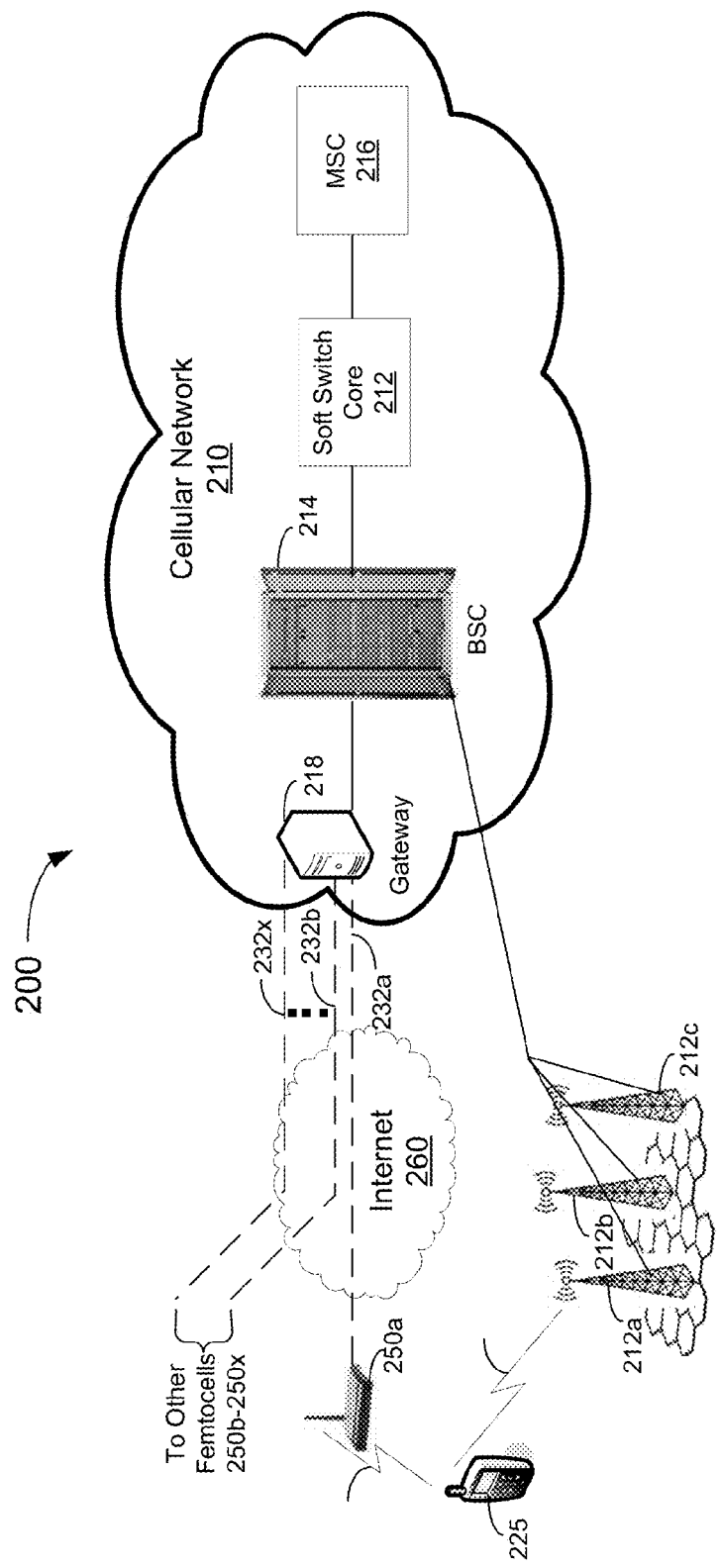
FIG. 2 is a diagrammatic representation of a conventional network system configuration featuring a femtocell.

FIG. 2 is a diagrammatic representation of a conventional network system 200 configuration featuring a femtocell. In the depicted example, a central BSC 214 deployed in a cellular carrier network 210 may connect with a soft switch core 212 that is connected with a MSC 216. MSC 216 connects with the cellular core network and may interface with other networks, such as the PSTN as is understood. BSC 214 may be connected with and service numerous BTSs 212a-212c that provide macrocells to cellular network 210 subscribers.

BSC 214 may additionally connect with a tunnel gateway system 218 that is adapted to establish secured tunnels 232a-232x with respective femtocell systems 250a-250x. Femtocells comprise cellular access points that connect to a mobile operator's network using, for example, a residential DSL or cable broadband connection. Femtocells 250a-250x provide a radio access point for UE 225 when the UE is within range of a femtocell system with which the UE has authorized access. For example, femtocell system 250a may be deployed in a residence of the user of UE 225. Accordingly, when the user is within the residence, mobile telecommunications may be provided to UE 225 via an air-interface provided by femtocell system 250a. In this instance, UE 225 is effectively offloaded from the macro BTS, e.g., BTS 212a, and communications to and from the UE are carried out with femtocell system 250a over Internet 260. Thus, femtocell systems 250a-250x may reduce the radio resource demands by off-loading UEs from macrocells to femtocells and thereby provide for increased subscriber capacity of cellular network 210.

In contemporary implementations such as that depicted in FIG. 2, a femtocell system 250a comprises a transceiver without intelligence and is thus required to be connected and managed by BSC 214. Thus, femtocell systems 250a-250x are reliant on the carrier network centralized BSC 214 which has limited capacity and thus does not exhibit desirable scaling characteristics or capabilities. Moreover, high communications overhead are realized by the BTS backhaul.

Figure 3:
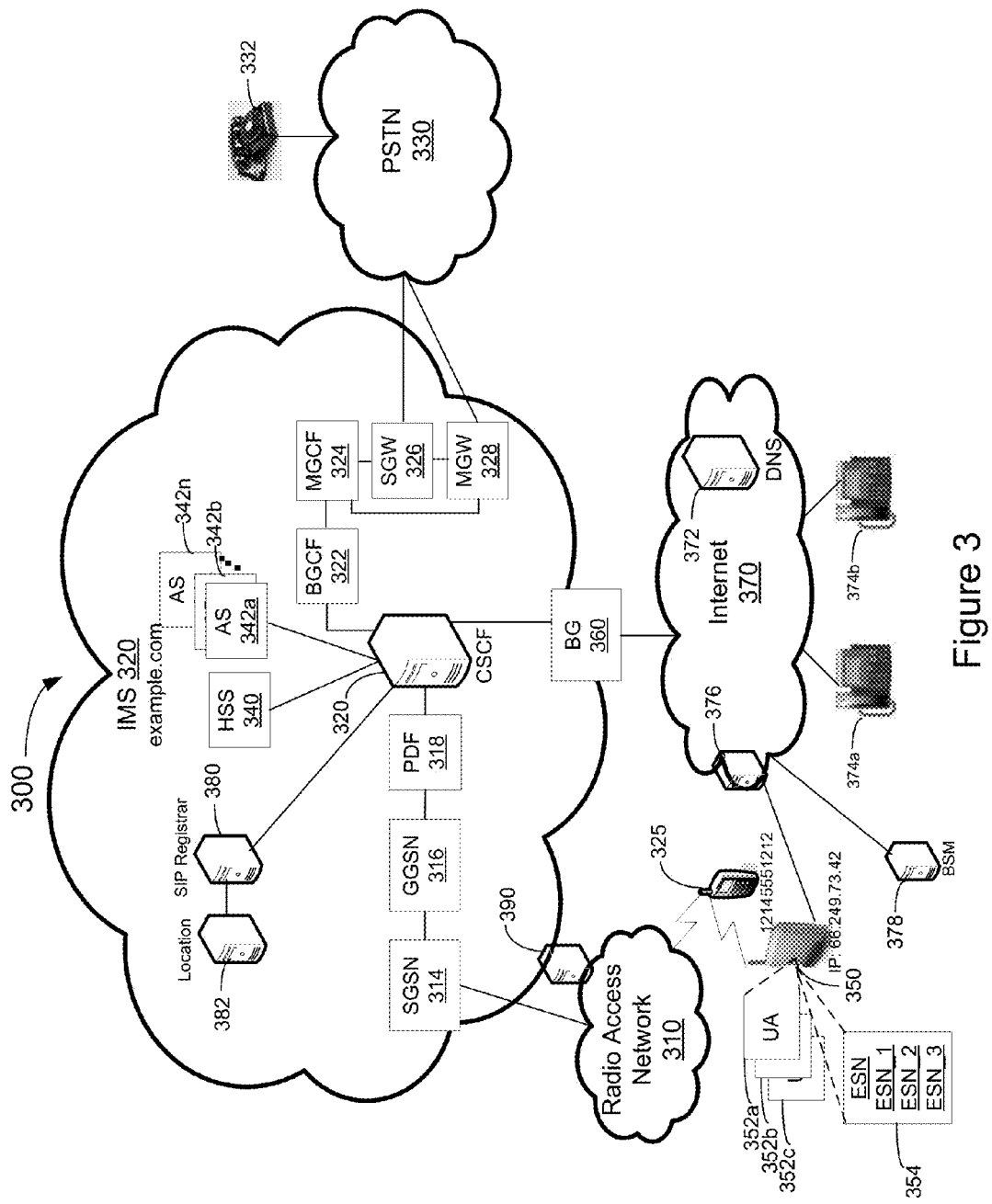
FIG. 3 is a diagrammatic representation of a network system in which a femtocell system implemented in accordance with an embodiment of the present invention may be deployed.

FIG. 3 is a diagrammatic representation of a network system 300 in which a femtocell system implemented in accordance with an embodiment of the invention may be deployed. System 300 includes a radio access network (RAN) 310 that provides an over-the-air interface with a UE 325, e.g., a mobile terminal. RAN 310 may comprise, for example, a CDMA radio access network or another suitable RAN. RAN 310 may comprise various BTSs and associated base station controllers BSCs as well as other infrastructure as is understood. UE 325 may be implemented as a personal digital assistant (PDA), a mobile phone, a computer, or another device adapted to interface with RAN 310.

System 300 may include an IP Multimedia Subsystem (IMS) 320 architecture adapted to provide IP service to UE 325. To this end, RAN 310 is communicatively coupled with a serving general packet radio service (GPRS) support node (SGSN) 314 and a gateway GPRS support node (GGSN) 316. SGSN 314 provides the delivery of data packets from and to UE 325 within its service area. GGSN 316 provides an interface between the GPRS backbone network and external packet data networks. GGSN 316 is communicatively coupled with a policy decision function (PDF) 318 that provides authorization of media plane resources, e.g., quality of service (QoS) authorizations, policy control, bandwidth management, and the like. PDF 318 may be communicatively coupled with a call session control function (CSCF) 320.

CSCF 320 comprises various session initiation protocol (SIP) servers or proxies that process SIP signaling packets in IMS 320. CSCF 320 may include a proxy-CSCF (P-CSCF) that provides a first point of contact for an IMS-compliant UE. The P-CSCF may be located in the visited network, or in the UE's home network if the visited network is not fully IMS-compliant. UE 325 may discover the P-CSCF, e.g., by using Dynamic Host Configuration Protocol (DHCP), or by assignment in a packet data protocol (PDP) context. CSCF 320 additionally includes a Serving-CSCF (S-CSCF) that comprises the central node of the signaling plane. The S-CSCF comprises a SIP server, but additionally performs session control. The S-CSCF is located in the home network and interfaces with a home subscriber server (HSS) 340 to download and upload user profiles. CSCF 320 further includes an Interrogating-CSCF (I-CSCF) that comprises a SIP function located at the edge of an administrative domain. The I-CSCF has an IP address that is published in the Domain Name System (DNS) 372 that facilitates location of the I-CSCF by remote servers. Thus, the I-CSCF is used as a forwarding point for receipt of SIP packets within the domain.

HSS 340 comprises a user database that supports the IMS network entities that manage calls. HSS 340 stores user profiles that specify subscription-related information of authorized users, authenticates and authorizes users, and provides information about the user's physical location. Various application servers (AS) 342a-342n that host and execute services interface with CSCF 320 via SIP.

CSCF 320 is coupled with a breakout gateway control function (BGCF) 322 that comprises a SIP server that provides routing functionality based on telephone numbers. BGCF 322 is used when a UE places a call from the IMS to a phone in a circuit switched network, e.g., PSTN 330, or the public land mobile network. A media gateway controller Function (MGCF) 324 performs call control protocol conversion between SIP and ISDN User Part (ISUP) and interfaces with a signaling gateway (SGW) 326. SGW 326 interfaces with the signaling plane of a circuit switched network, e.g., PSTN 330. SGW 326 may transform lower layer protocols, such as Stream Control Transmission Protocol (SCTP), into the Message Transfer Part (MTP) protocol, and pass ISUP data from MGCF 324 to PSTN 330 or another circuit switched network. A media gateway (MGW) 328 interfaces with the media plane of PSTN 330 or another circuit switched network by converting data between real-time transport protocol (RTP) and pulse code modulation (PCM), and may also be employed for transcoding when the codecs of the IMS and circuit switched networks differ. Resources of MGW 328 are controlled by MGCF 324. Fixed access, e.g., IP telephony devices 374a-374b, may connect with IMS network via Internet 370 that is communicatively coupled with IMS network 320 by way of border gateway 360.

As is understood, DNS 372 comprises a scalable namespace that facilitates access to entities deployed on the Internet or private networks. DNS 372 maintains various records for host names, servers, and the like. For example, DNS 372 maintains records (commonly referred to as "A records") that map hostnames to IP addresses, pointer (PTR) records that map IP addresses to canonical names to facilitate reverse DNS lookups, service (SRV) records that specify information on available services, naming authority pointer (NAPTR) records that facilitate regular expression based rewriting, and various other records. DNS 372 may additionally include a telephone number mapping (ENUM) system that facilitates resolution of SIP addresses from E.164 number as is understood.

A base station manager (BSM) 378 may be deployed in Internet 370 and may be adapted to communicate with numerous femtocell systems and femtocell networks. BSM 378 may provide various operations, maintenance, and management functions to femtocell systems. For example, BSM 378 may provide service provisioning of femtocell systems, e.g., by providing configuration downloads to femtocell systems and preloading default configuration data for femtocell systems distributed via sales channels. BSM 378 may provide various support and maintenance features, such as alarm and periodic statistics reporting, automatic remote software image distribution to femtocell systems, provide upgrades and reconfigurations, and may provide remote access via Internet 370 for diagnostics and customer support.

In accordance with an embodiment, a femtocell system 350 may include integrated BTS and BSC functions and may feature additional capabilities available in the provided femtocell site coverage area. Femtocell system 350 provides an IP-accessible radio access network, is adapted for operation with IMS 320, and provides radio link control functions. Femtocell system 350 may be communicatively coupled with Internet 370 via any variety of backhaul technologies, such as an 802.11x link, a 10/100 BaseT LAN link, a T1/E1 Span or fiber, cable set top box, DSL modem connected with a central office digital subscriber line access multiplexer, a very small aperture terminal (VSAT), or another suitable backhaul infrastructure.

Femtocell system 350 may include a session initiation protocol (SIP) adapter that supports a SIP client pool and provides conversion of call set-up functions to SIP client set-up functions. For example, a SIP client pool allocated by femtocell system 350 may comprise a plurality of SIP user agents 352a-352c that each may be allocated for a UE authorized to access femtocell system 350. Additionally, femtocell system 350 includes electronic serial number (ESN) screening to allow only designated UEs to access the femtocell thereby restricting access to authorized home or small office UEs. For example, femtocell system 350 may be configured with an ESN list 354 that specifies ESNs of UEs authorized to access femtocell system 350. In the illustrative example, ESNs of "ESN 1"-"ESN 3" are included in ESN list 354. Provisioning of ESN(s) may be made as part of an initial femtocell system 350 activation. In the illustrative example, femtocell system 350 is allocated an Internet Protocol (IP) address of "66.249.73.42", and UE 325 is allocated a mobile services ISDN (MSISDN) number, or E.164 number, of "12145551212".

Figures 4, 5:
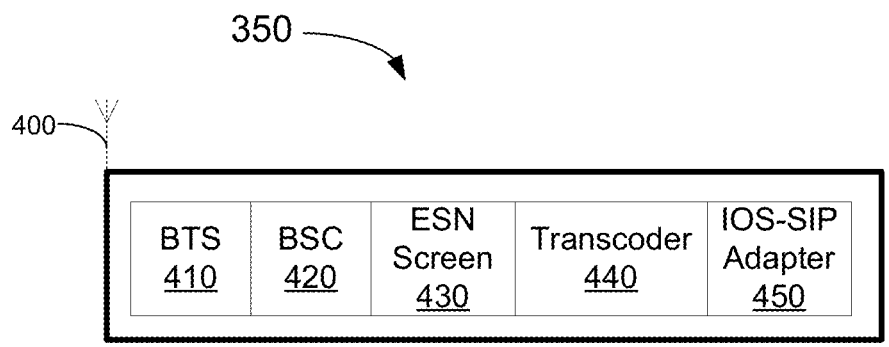
FIG. 4 is a simplified diagrammatic representation of the femtocell system depicted in FIG. 3 that may be connected with an IP backhaul in accordance with an embodiment.
FIG. 5 is a diagrammatic representation of an exemplary session initiation protocol registration message generated by a femtocell system on behalf of a user equipment in accordance with an embodiment.

FIG. 4 is a simplified diagrammatic representation of femtocell system 350 depicted in FIG. 3 that facilitates provisioning of a femto-RAN in accordance with an embodiment. Femtocell system 350 includes an antenna 400 coupled with a BTS 410. BTS 410 may be implemented, for example, as a 1xRTT ASIC device and may comprise a non-diversity receiver featuring a built-in duplexer. In an embodiment, BTS 410 may feature only one operational band and may include a transmitter scan receiver and local oscillator. BTS 410 may be communicatively coupled with a BSC 420 that provides radio control functions, such as receiving measurements from UEs, such as mobile phones, control of handovers to and from other femtocell systems, and may additionally facilitate handoff to or from macrocells.

Femtocell system 350 includes an electronic serial number screening function 430 that may facilitate approving or rejecting service for a UE by femtocell system 350. Femtocell system 350 includes a transcoder 440 and an Internet Operating System (10S) and SIP Adapter (collectively referred to as IOS-SIP Adapter 450). IOS-SIP adapter 450 may invoke and manage SIP clients, such as a user agent (UA) pool comprising one or more UAs. In accordance with an embodiment, each UE 325 authorized to be serviced by femtocell system 350 may have a UA allocated therefor by femtocell system in a manner that facilitates transmission of communications to and from a UE over an IP backhaul. Accordingly, when an authorized UE is within the femtocell system 350 site range, telecommunication services may be provided to the UE via the IP backhaul and femtocell system 350 provisioned RAN. When the UE is moved beyond the service range of femtocell system 350, telecommunication service may then be provided to the UE via macrocellular coverage.

To facilitate routing of calls from circuit switched call originators, femtocell system 350 may perform a DNS/ENUM registration on behalf of UEs authorized to obtain service from femtocell system 350. In the present example, assume UE 325 with a MSISDN of "12145551212" has a SIP service subscription in the domain "example.com" and has a SIP uniform resource identifier (URI) of "12145551212@example.com". An example DNS/ENUM registration message generated by femtocell system 350 on behalf of UE 325 and transmitted to DNS 372 is as follows:

$ORIGIN 2.1.2.1.5.5.5.4.1.2.1.e164.arpa.
IN NAPTR 100 10 "u" "E2U+sip" "!^.*$!sip:12145551212@example.com!".

As is understood, the first line of the registration message comprises the MSISDN number of the UE converted (i.e., reversed with each numeral delineated with a "." character and appended with the e164.arpa domain) for DNS lookup. The second line of the registration message specifies the NAPTR record for the hosts that can further process the address—the domain "example.com" (in which the UE with a URI of 12145551212@example.com is registered) in the present example.

Femtocell system 350 may generate and issue a SIP registration on behalf of UE 325 authorized for service access by femtocell system 350. FIG. 5 is a diagrammatic representation of an exemplary SIP registration message 500 generated by femtocell system 350 on behalf of UE 325 authorized for service access thereby in accordance with an embodiment. Registration message 500 may be transmitted from femtocell system 350 to a location service, such as a SIP registrar implemented as SIP Registrar 380. Registrar 380 may provide the location and contact information to location service 382. Registration message 500 includes a REGISTER field 510 that specifies the registration is being made within the domain "example.com". Multiple contacts may be included in registration message 500. In the present example, registration message 500 includes a contact field 512 that specifies a SIP contact for UE 325. Notably, the SIP contact field 512 for UE 325 specifies the UA registered on behalf of UE with the URI 12145551212@example.com is located at the IP address of "66.249.73.42". That is, the SIP contact registered by femtocell system 350 on behalf of UE 325 is to be addressed at the femtocell system 350 address of 66.249.73.42 thereby resulting in routing of SIP signaling messages to femtocell system 325. In turn, femtocell system 350 may convert SIP call set up messaging to RAN signaling, allocate an uplink and a downlink channel for UE 325, and set up a call or data session thereon.

In the present example, registration message 500 includes a second contact field 514 that specifies a telephone URI, e.g., the MSISDN+1-214-555-1212 of UE 325. Thus, a location query for the SIP URI sip:12145551212@example.com would return two contacts. The first is the SIP URI that can be used to reach femtocell system 350, and thus UE 325 thereby, and the second is the telephone URI that can be used to reach UE 325 via macrocellular coverage, i.e., via RAN 310. As is understood, the order of contacts 512-514 provides a contact preference, and the multiple contacts may be registered in separate registration messages. The depicted registration message including both the SIP contact URI and telephone URI is exemplary only. Accordingly, in the present example, an attempt to contact UE 325 may first be made via the SIP URI 12145551212@example.com. In the event that the session is not successfully set up via the SIP contact, an attempt may be made to setup a session via RAN 310 using the telephone URI.

When the UE 325 moves outside the coverage area of femtocell system 350, another registration may be generated and submitted by femtocell system 350 on behalf of UE 325 where the telephone URI is designated as the preferred contact. Further, the SIP URI may be removed from the registration when the UE 325 moves outside the coverage area of femtocell system 350 thereby avoiding any attempts to establish a session with UE 325 via femtocell system 350 when UE 325 has moved beyond the femtocell system 350 coverage area.

To better facilitate an understanding of disclosed embodiments, consider a call placed at circuit switched telephone 332 to UE 325. A gateway receives the call setup request, e.g., an Initial Address Message (IAM), and a query may be made with DNS 372 from which the domain "example.com" is resolved from the ENUM function. An INVITE message is then transmitted to the example.com domain which, in turn, resolves the location of the called UE 325. Particularly, CSCF 320 may interrogate location server 382 and determine UE 325 is registered as located at the IP address 66.249.73.42. Accordingly, the INVITE message is routed to proxy server 376 which forwards the INVITE message to femtocell system 350. Femtocell system 350 may then perform paging, channel allocation, and other procedures for provisioning a radio interface with UE 325 and issue SIP responses on behalf of UE 325. Thus, from a network perspective, femtocell system 350 appears as a user agent to which the call is directed. Further, UE 325 does not require a SIP client for receiving the call because femtocell system 350 advantageously performs signaling and media conversion for signaling and media transmissions over-the-air interface with 325. Thus, femtocell system 350 may appear as a conventional BTS to UE 325. A call from UE 325 to another terminal, such as circuit-switched telephone 332, a SIP client such as packet-switched telephony device 374a, or another device, may similarly be facilitated by femtocell system 350.

As a second example, assume UE 325 has moved beyond the range of femtocell system 350. As noted above, femtocell system 350 may generate and transmit a registration message that excludes the SIP contact to facilitate provisioning of telecommunication services via macrocell coverage, e.g., via RAN 310. For instance, femtocell system 350 may periodically perform power measurements with UE 325, and upon the power measurement dropping below a particular power threshold, femtocell system may determine UE 325 is to be serviced by macrocellular coverage. Alternatively, a user may select macrocellular coverage via a user interface provided on UE 325. In this instance, UE 325 may provide an indication to femtocell system 350 that telecommunication services are to be provided by RAN 310. Other scenarios may similarly result in a determination that UE 325 is to be serviced by RAN 310. Upon such a determination, femtocell system 350 may generate and transmit a registration message on behalf of UE 325 to a registrar service, e.g., CSCF 320 and SIP registrar 380. The contact information may then be updated in location server 382 to indicate the telephone URI as the contact of UE 325. In this scenario, consider a call placed at circuit switched telephone 332 to UE 325. A gateway receives the call setup request, e.g., an Initial Address Message (IAM), and a query may be made with DNS server 372 from which the domain "example.com" is resolved from the ENUM service. An INVITE message is then transmitted to the example.com domain which resolves the location of called UE 325. In the present example, CSCF 320 may interrogate location server 382 and determine UE 325 has a preferred contact registered as a telephone URI of 2145551212. Accordingly, the INVITE message is routed to a gateway server, e.g., gateway server 390 which translates the INVITE message to a RAN-compliant call request signaling. The call may then be setup via RAN 310 accordingly.

A network of femtocell systems may be deployed and connected with an IP backhaul. In this implementation, an authorized UE may be serviced by the femtocell network, and service may be transferred from one femtocell to another femtocell via a femtocell handoff procedure. In the event that the femtocell network is deployed in an area serviced by a macrocellular network, handoff routines may provide preference for transferring a UE to a target femtocell system rather than a macrocell site. In the event that a suitable femtocell is unavailable for handoff of a UE, the UE may be transferred to the macrocell site.

Figure 6:
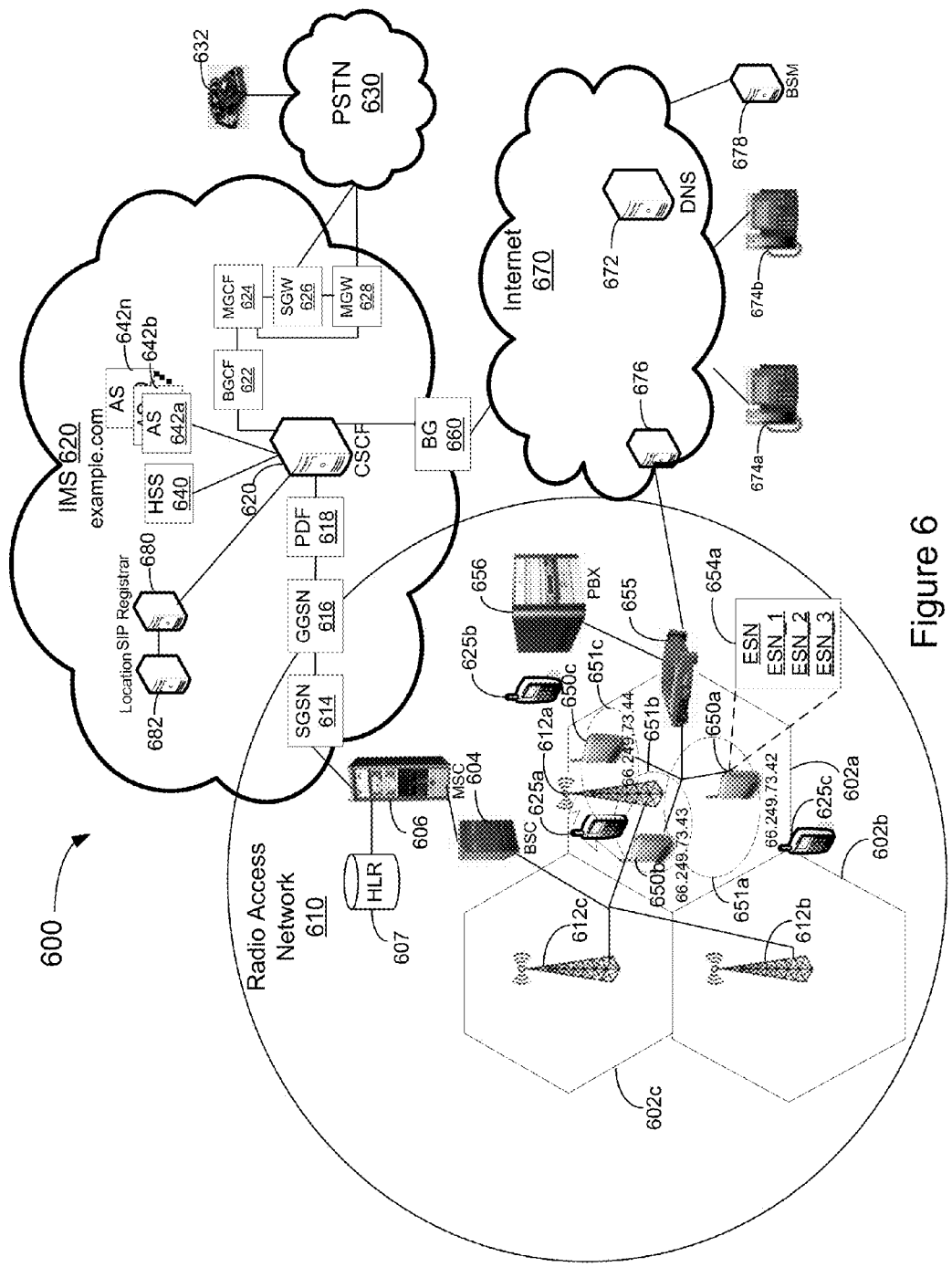
FIG. 6 is a diagrammatic representation of a network system featuring a femtocell network implemented in accordance with an embodiment.

FIG. 6 is a diagrammatic representation of a network system 600 featuring a femtocell network implemented in accordance with an embodiment of the invention. System 600 includes a RAN 610 that provides an over-the-air interface with UEs 625a-625c, e.g., a mobile terminal. RAN 610 may comprise, for example, a CDMA radio access network or another suitable RAN. RAN 610 may comprise various BTSs 612a-612c and associated BSCs 604 as well as other infrastructure as is understood. Each of BTSs 612a-612c provide a respective macrocell 602a-602c that may provide telecommunication service to UEs 625a-625c. BSC 604 is coupled with a MSC 606 that provides cellular exchange services, mobility management, and other services within the area that it serves as is understood. MSC 606 may interface with a home location register (HLR) with which one or more user equipments are registered.

RAN 610 may interface with IMS 620 adapted to provide IP service to UEs 625a-625c. To this end, RAN 610 may be communicatively coupled with a SGSN 614 and a GGSN 616. GGSN 616 is communicatively coupled with a PDF 618 that provides authorization of media plane resources. PDF 618 may be communicatively coupled with a CSCF 620.

CSCF 620 comprises various SIP servers or proxies that process SIP signaling packets in IMS 620. CSCF 620 may include a P-CSCF, a S-CSCF, and an I-CSCF as is understood. HSS 640 stores user profiles that specify subscription-related information of authorized users, authenticates and authorizes users, and provides information about the user's physical location. Various application servers 642a-642n may host and execute services and is interfaced with CSCF 620 via SIP.

The I-CSCF has an IP address that is published in DNS 672 that facilitates location of the I-CSCF by remote servers. Thus, the I-CSCF is used as a forwarding point for receipt of SIP packets within the domain.

CSCF 620 is coupled with a BGCF 622 that comprises a SIP server that provides routing functionality based on telephone numbers. A MGCF 624 performs call control protocol conversion between SIP and ISDN User Part (ISUP) and interfaces with a SGW 626 that itself interfaces with the signaling plane of a circuit switched network, e.g., PSTN 630. A MGW 628 interfaces with the media plane of PSTN 630 or another circuit switched network. Resources of MGW 628 are controlled by MGCF 624. Fixed access devices, e.g., IP telephony devices 674a-674b, may connect with IMS network via Internet 670 that is communicatively coupled with IMS network 620 by way of border gateway 660.

Femtocell systems 650a-650c may include integrated BTS and BSC functions and may feature additional capabilities available in the provided femtocell site coverage areas. Femtocell systems 650a-650c provide an IP-accessible radio access network, are adapted for operation with IMS 620, and provide radio link control functions. Femtocell systems 650a-650c may be communicatively coupled with Internet 670 via any variety of backhaul technologies, such as an 802.11x link, a 10/100 BaseT LAN link, a T1/E1 Span or fiber, cable set top box, DSL modem connected with a central office digital subscriber line access multiplexer, a very small aperture terminal (VSAT), or another suitable backhaul infrastructure. In the illustrative example, femtocell systems 650a-650c are each coupled with an IP backhaul access device 655, such as an Ethernet cable or DSL router. For instance, femtocell systems 650a-650c may be coupled with access node 655 via respective 10/100BaseT twisted pair cables, Category 5 cabling, or other suitable interconnection.

Each of femtocell systems 650a-650c provide a respective femtocell site 651a-651c in which UEs 625a-625c may be provided telecommunication services over an air interface. Femtocell systems 650a-650c are communicatively coupled with one another via access device 655. Femtocells 650a-650c deployed for conjunctively providing a femtocell service coverage area comprised of the collective femtocell sites 651a-651c are collectively referred to herein as a femtocell network. In an embodiment, femtocell systems 650a-650c may exchange messages with one another to facilitate handoff of a UE from one femtocell to another, e.g., as UE 625a moves out of the radio range of a femtocell and into the radio range of another. In the depicted example, the femtocell network provided by femtocell systems 650a-650c is at least partially overlapped by one or more macrocell sites 602a-602c provisioned by macrocell BTSs 612a-612c. In such an implementation, femtocell systems 650a-650c may provide preference to another femtocell for handoff of a UE thereto. In the event that another femtocell is not available or is unsuitable for a handoff, the UE may then be transferred to macrocellular coverage via a handoff to a macrocell BTS.

Each of femtocell system 650a-650c may include a respective SIP adapter that supports a SIP client pool and provides conversion of call set-up functions to SIP client set-up functions. Additionally, femtocell systems 650a-650c include ESN screening to allow only designated UEs to access the femtocells thereby restricting access to authorized home or small office UEs. For example, femtocell system 650a may be configured with an ESN list 654a that specifies ESNs of UEs authorized to access femtocell system 650. In the illustrative example, ESNs of "ESN 1"-"ESN 3" are included in ESN list 654a. Provisioning of ESN(s) may be made as part of an initial femtocell system 650 activation. Other femtocell systems 650b-650c may be similarly configured with an ESN list including ESNs of UEs authorized to access the femtocell system network comprised of femtocell systems 650a-650c. In the illustrative example, femtocell systems 650a-650c are allocated a respective IP address of "66.249.73.42", "66.249.73.43", and "66.249.73.44".

A private branch exchange (PBX) 656, e.g., an IP-PBX, may be deployed onsite at the SOHO that hosts the femtocell network comprising femtocell systems 650a-650c. In the illustrative example, PBX 656 is interconnected with access device 655. PBX 656 may provide telephone exchange services for UEs authorized to access the femtocell network.

A BSM 678 may be deployed in Internet 670 and may be adapted to communicate with numerous femtocell systems and femtocell networks. BSM 678 may provide various operations, maintenance, and management functions to femtocell systems. BSM 678 may provide service provisioning of femtocell systems, e.g., by providing configuration downloads to femtocell systems and preloading default configuration data for femtocell systems distributed via sales channels. BSM 678 may provide various support and maintenance features, such as alarm and periodic statistics reporting, automatic remote software image distribution to femtocell systems, provide upgrades and reconfigurations, and may provide remote access via Internet 670 for diagnostics and customer support.

In accordance with an embodiment, mechanisms for processing registration and authentication procedures by an IP-based femtocell system in a network system are provided. In one implementation, the femtocell system includes a base transceiver station and a Session Initiation Protocol to Internet Operating System adapter. The femtocell system receives a registration message from the user equipment and issues a location update on behalf of the user equipment. The femtocell system transmits both an IP Multimedia Private Identity and IP Multimedia Public Identity to a core network and receives an authentication request therefrom. The authentication request includes a random value used for authenticating the user equipment that is obtained from a home location register with which the user equipment is registered. The femtocell system then transmits an authentication request to the user equipment and receives an authentication challenge response therefrom. The femtocell system then transmits the authentication challenge response to the core network. In the event that the challenge response is valid, the user equipment is authenticated and may begin receiving communication services from the femtocell system.

Figure 7:
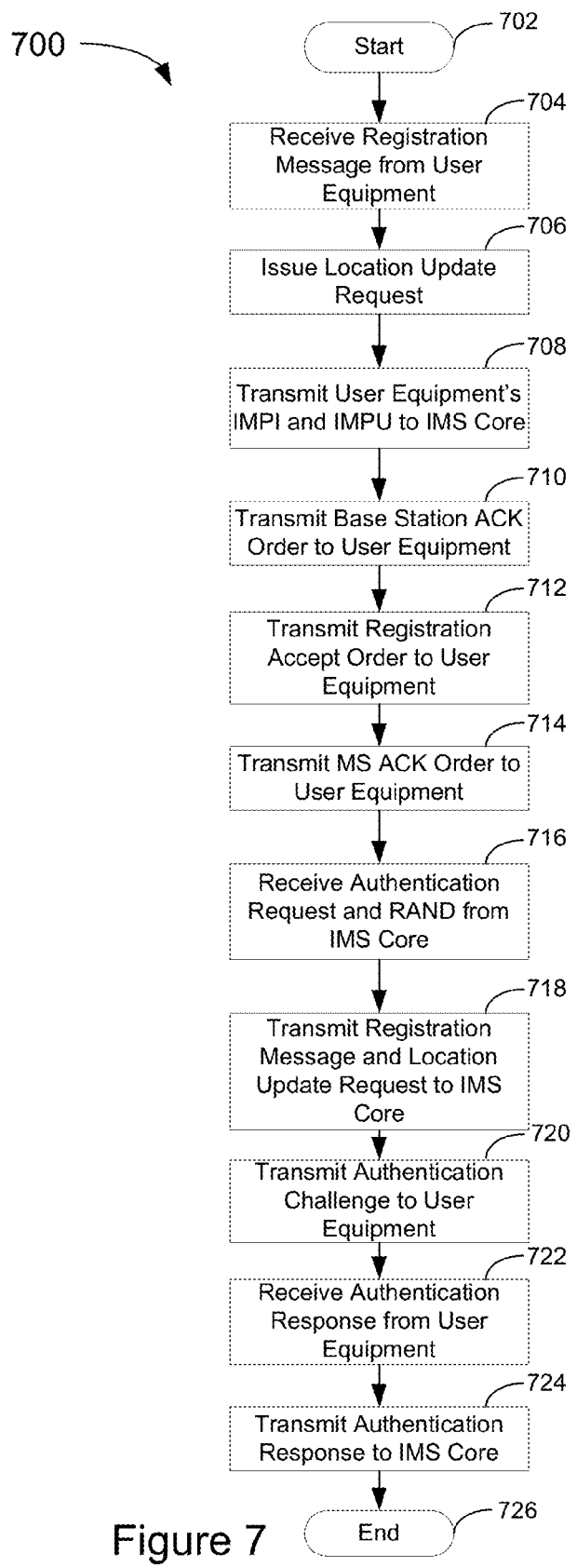
FIG. 7 is a flowchart that depicts a femtocell registration and authentication processing routine implemented in accordance with an embodiment.

FIG. 7 is a flowchart 700 that depicts a femtocell registration and authentication processing routine implemented in accordance with an embodiment. The processing routine may be implemented as a set of executable instructions tangibly embodied on a computer-readable medium that are executable by a processing system, such as a femtocell system implemented in accordance with disclosed embodiments.

The processing routine is invoked (step 702), and the femtocell system, e.g., the base transceiver station of the femtocell system, receives a registration message from a UE (step 704). The femtocell system then issues a location update request (step 706) and transmits the UE's IP Multimedia Private Identity (IMPI) and IP Multimedia Public Identity (IMPU) to the IMS core network (step 708). The femtocell system's base transceiver station then transmits a base station acknowledgment (ACK) order (step 710), a registration accept order (step 712), and a mobile station ACK order (step 714) to the user equipment.

The femtocell system receives an authentication request and random (RAND) value used for authentication purposes from the IMS core network (step 716) and, in turn, transmits a registration message and location update request to the IMS core network (step 718). The femtocell system then transmits an authentication challenge to the user equipment (step 720) and awaits receipt of an authentication response, e.g., a challenge response, therefrom (step 722). The authentication response is then transmitted to the IMS core network by the femtocell system (step 724). Assuming the UE's authentication response is valid, the registration and authenticating processing routine cycle may then end (step 726), and the UE may then be provisioned communication services by the femtocell system.

Figure 8:
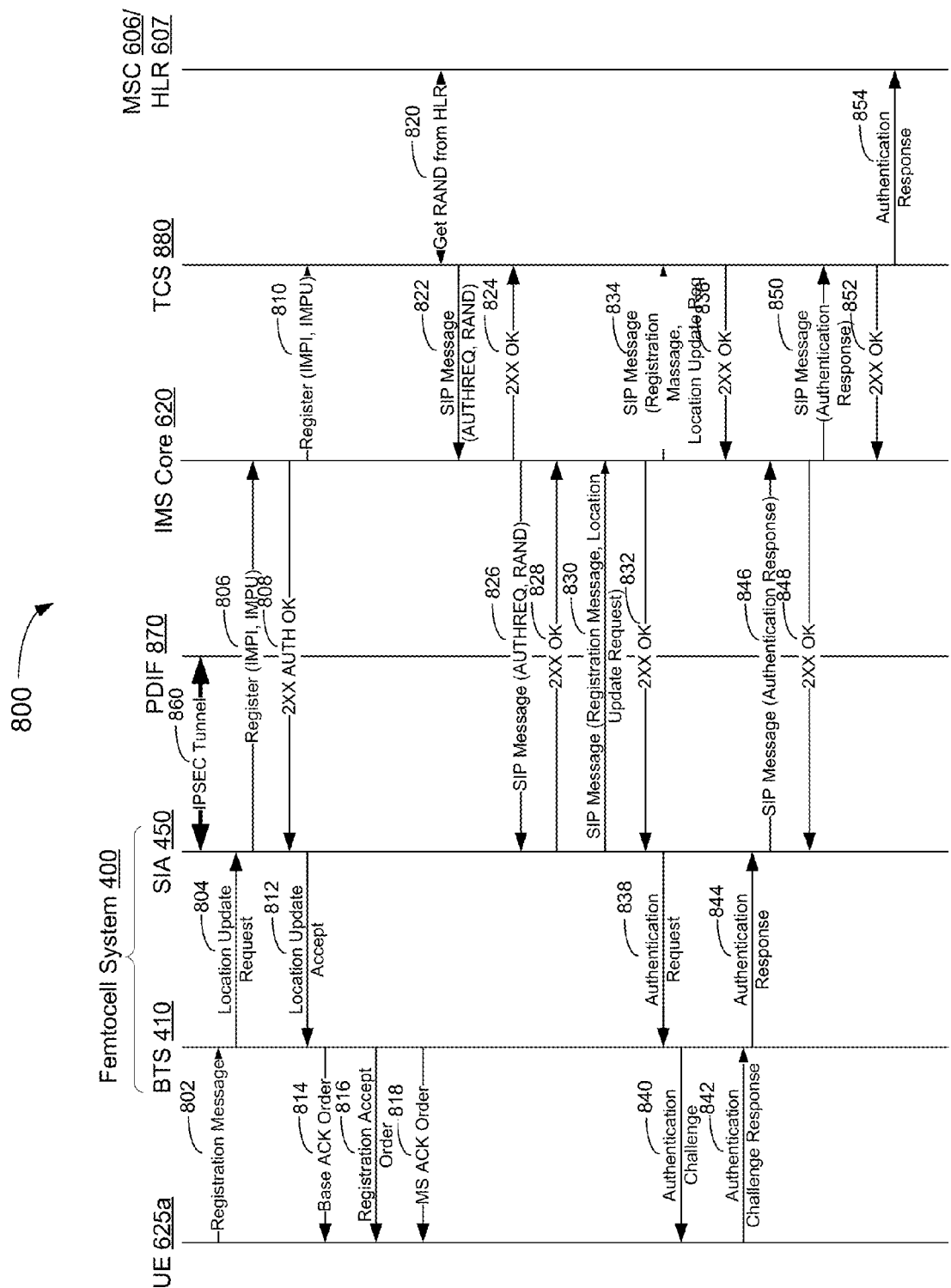
FIG. 8 shows a diagrammatic representation of a signaling flow for a registration and authentication processing routine implemented in accordance with an embodiment.

FIG. 8 shows a diagrammatic representation of a signaling flow 800 for a registration and authentication processing routine implemented in accordance with an embodiment. In the illustrative example, a user equipment 625a initiates a registration and authentication procedure with a femtocell system 400 over an air interface with the femtocell system's base transceiver station by transmitting a registration message thereto (step 802), which, in turn, conveys a location update request to the femtocell system's SIP to IOS adapter (SIA) (step 804). The SIA then transmits a register message to the IMS core that includes the user equipment's IP Multimedia Private Identity (IMPI) and IP Multimedia Public Identity (IMPU) (step 806). Message transmissions between the femtocell system and the IMS core network may be secured via a packet data interworking function (PDIF) 870 with which the femtocell may have established an IP security (IPSEC) tunnel 860. In response to receiving the register message from the SIA, the IMS core network may reply with an acknowledgment message, e.g., a SIP 2XX response (step 808). The IMS core network may then transmit a register message that includes the UE's IMPI and IMPU to a TCS 880 (step 810).

After receiving the acknowledgment message from the IMS core network, the SIA may convey a location update accept message to the femtocell system's base transceiver station (step 812). The base transceiver station may then transmit a base station acknowledgment order to the UE (step 814) as well as a registration accept order (step 816) and a mobile station acknowledgment order (step 818).

The TCS obtains a random number or other randomized value (RAND) used for authentication from the home location register (HLR) with which the UE is registered (step 820), and transmits a SIP message including an authentication request (AUTHREQ) and the random value to the IMS core network (step 822) which, in turn, may transmit an acknowledgment, e.g., a SIP 2XX response, to the TCS (step 824). The IMS core network may then transmit, e.g., via a SIP message, the authentication request and random number to the SIA (step 826) which may reply with an acknowledgment, e.g., a SIP 2XX response (step 828). The SIA then transmits a registration message and location update request to the IMS core network (step 830) which replies with an acknowledgment such as a SIP 2XX response (step 832). The IMS core network then conveys the registration message and location update request to the TCS (step 834) which may reply with a SIP 2XX response (step 836).

After receiving the authorization request from the IMS core network, the SIA conveys an authentication request to the base transceiver station (step 838) which, in turn, issues an authentication challenge to the UE (step 840). The base transceiver station then awaits receipt of a challenge response from the UE (step 842) and forwards the authentication response to the SIA (step 844). The SIA then conveys the authentication challenge response to the IMS core network (step 846) which acknowledges receipt of the response, e.g., via a SIP 2XX response (step 848). The IMS core network then transmits the authentication response to the TCS (step 850) which may reply with a SIP 2XX response (step 852). The authentication response is then transmitted to the MSC/HLR (step 854). Assuming the authentication response is valid, the registration and authentication routine may then complete and the UE may be provisioned communication services via the femtocell system.

As described, mechanisms for processing registration and authentication procedures by an IP-based femtocell system in a network system are provided. In one implementation, the femtocell system includes a base transceiver station and a Session Initiation Protocol to Internet Operating System adapter. The femtocell system receives a registration message from the user equipment and issues a location update on behalf of the user equipment. The femtocell system transmits both an IP Multimedia Private Identity and IP Multimedia Public Identity to a core network and receives an authentication request therefrom. The authentication request includes a random value used for authenticating the user equipment that is obtained from a home location register with which the user equipment is registered. The femtocell system then transmits an authentication challenge to the user equipment and receives an authentication challenge response therefrom. The femtocell system then transmits the authentication challenge response to the core network. In the event that the challenge response is valid, the user equipment is authenticated and may begin receiving communication services from the femtocell system.

The flowchart of FIG. 7 depicts process serialization to facilitate an understanding of disclosed embodiments and is not necessarily indicative of the serialization of the operations being performed. In various embodiments, the processing steps described in FIG. 7 may be performed in varying order, and one or more depicted steps may be performed in parallel with other steps. Additionally, execution of some processing steps of FIG. 7 may be excluded without departing from embodiments disclosed herein.

The illustrative block diagrams depict process steps or blocks that may represent modules, segments, or portions of code that include one or more executable instructions for implementing specific logical functions or steps in the process. Although the particular examples illustrate specific process steps or procedures, many alternative implementations are possible and may be made by simple design choice. Some process steps may be executed in different order from the specific description herein based on, for example, considerations of function, purpose, conformance to standard, legacy structure, user interface design, and the like.

Aspects of the present invention may be implemented in software, hardware, firmware, or a combination thereof. The various elements of the system, either individually or in combination, may be implemented as a computer program product tangibly embodied in a machine-readable storage device for execution by a processing unit. Various steps of embodiments of the invention may be performed by a computer processor executing a program tangibly embodied on a computer-readable medium to perform functions by operating on input and generating output. The computer-readable medium may be, for example, a memory, a transportable medium such as a compact disk, a floppy disk, or a diskette, such that a computer program embodying the aspects of the present invention can be loaded onto a computer. The computer program is not limited to any particular embodiment, and may, for example, be implemented in an operating system, application program, foreground or background process, driver, network stack, or any combination thereof, executing on a single processor or multiple processors. Additionally, various steps of embodiments of the invention may provide one or more data structures generated, produced, received, or otherwise implemented on a computer-readable medium, such as a memory.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:

1. A method, comprising:
issuing, by the base transceiver station of at least one femtocell to the Session Initiation Protocol to Internet Operating System adapter of the at least one femtocell, a location update request on behalf of the user equipment;
conveying an authentication request by the Session Initiation Protocol to Internet Operating System adapter of the at least one femtocell to the base transceiver station;
receiving the authentication request in the base transceiver station of the at least one femtocell;
generating an authentication challenge from the authentication request in the base transceiver station of the at least one femtocell; and
transmitting the authentication challenge from the base transceiver station of the at least one femtocell to the user equipment.

2. The method of claim 1, further comprising:
transmitting, by the at least one femtocell, a register message to a core network, wherein transmitting the register message to the core network further comprises transmitting the register message including an IP Multimedia Private Identity and an IP Multimedia Public Identity associated with the user equipment.

3. The method of claim 1, wherein receiving an authentication request comprises receiving the authentication request and a random value used to authenticate the user equipment.

4. The method of claim 1, further comprising:
transmitting, by the femtocell system, a base station acknowledgment order to the user equipment;
transmitting, by the femtocell system, a registration accept order to the user equipment; and
transmitting, by the femtocell system, a mobile station acknowledgment order to the user equipment.

5. The method of claim 1, further comprising transmitting, by the core network, the register message to a traffic control subsystem.

6. The method of claim 5, further comprising obtaining, by the traffic control subsystem, a random value from a home location register with which the user equipment is registered, wherein the random value is used for authenticating the user equipment.

7. The method of claim 1, further comprising receiving, by the femtocell system, an authentication challenge response from the user equipment.

8. The method of claim 7, further comprising transmitting, by the femtocell system, the authentication challenge response to the core network.

9. A non-transitory computer-readable storage medium having computer-executable instructions for execution by a processing system, the computer-executable instructions that:
issue by the base transceiver station of at least one femtocell to the Session Initiation Protocol to Internet Operating System adapter of the at least one femtocell, a location update request on behalf of the user equipment;
convey an authentication challenge by the Session Initiation Protocol to Internet Operating System adapter of the at least one femtocell to the base transceiver station; and
transmit the authentication challenge from the base transceiver station of the at least one femtocell to the user equipment.

10. The non-transitory computer-readable storage medium of claim 9, wherein the instructions that receive an authentication request comprise instructions that receive the authentication request and a random value used to authenticate the user equipment.

11. The non-transitory computer-readable storage medium of claim 9, further comprising instructions that cause the processor to:
transmit a base station acknowledgment order to the user equipment;
transmit a registration accept order to the user equipment; and
transmit a mobile station acknowledgment order to the user equipment.

12. The non-transitory computer-readable storage medium of claim 9, further comprising instructions that:
transmit a register message to a traffic control subsystem, wherein the register message includes an IP Multimedia Private Identity and an IP Multimedia Public Identity associated with the user equipment to a core network.

13. The non-transitory computer-readable storage medium of claim 12, further comprising instructions that obtain, by the traffic control subsystem, a random value from a home location register with which the user equipment is registered, wherein the random value is used for authenticating the user equipment.

14. The non-transitory computer-readable storage medium of claim 9, further comprising instructions that cause the processor to receive, by the femtocell system, an authentication challenge response from the user equipment.

15. The non-transitory computer-readable storage medium of claim 14, further comprising instructions that transmit the authentication challenge response to the core network.

16. A system, comprising:
a packet-switched network;
an Internet Protocol Multimedia subsystem communicatively coupled with the packet-switched network; and
a femtocell system communicatively coupled with the packet-switched network, wherein the femtocell system includes a base transceiver station and a Session Initiation Protocol to Internet Operating System adapter; wherein the base transceiver station issues a location update request on behalf of a user equipment that is received by the Session Initiation Protocol to Internet Operating System adapter, wherein the Session Initiation Protocol to Internet Operating System adapter transmits a register message including an IP Multimedia Private Identity and an IP Multimedia Public Identity associated with the user equipment to the Internet Protocol Multimedia subsystem, conveys an authentication request by the Session Initiation Protocol to Internet Operating System adapter of at least one femtocell to the base transceiver station, and receives the authentication request and a random value used to authenticate the user equipment from the Internet Protocol Multimedia subsystem, and wherein the base transceiver station transmits an authentication challenge to the user equipment.

17. The system of claim 16, wherein the base transceiver station transmits a base station acknowledgment order, a registration accept order, and a mobile station acknowledgment order to the user equipment.

18. The system of claim 16, further comprising a traffic control subsystem, wherein the Internet Protocol Multimedia subsystem transmits the register message to the traffic control subsystem.

19. The system of claim 18, wherein the traffic control subsystem obtains the random value from a home location register with which the user equipment is registered, wherein the random value is used for authenticating the user equipment.

20. The system of claim 16, wherein the base transceiver station receives an authentication challenge response from the user equipment, and wherein the femtocell system transmits the challenge response to the Internet Protocol Multimedia subsystem.

* * * * *